United States Patent
Hillman et al.

(10) Patent No.: US 9,706,173 B1
(45) Date of Patent: *Jul. 11, 2017

(54) ROOF INSPECTION DEVICES, METHODS, AND SYSTEMS

(71) Applicant: United Services Automobile Association (USAA), San Antonio, TX (US)

(72) Inventors: James P. Hillman, San Antonio, TX (US); Cynthia Blasing, Hondo, TX (US); Damien Brunet, Schertz, TX (US); Dan D. Cable, Garden Ridge, TX (US); Adolfo J. Fernandez, San Antonio, TX (US); Jeffrey A. Kreth, San Antonio, TX (US); Shane Osborne, Marion, TX (US); Robert A. Pacheco, San Antonio, TX (US); Renee Sokolowski, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 67 days.

This patent is subject to a terminal disclaimer.

(21) Appl. No.: 13/781,389

(22) Filed: Feb. 28, 2013

Related U.S. Application Data

(63) Continuation-in-part of application No. 13/298,083, filed on Nov. 16, 2011.

(60) Provisional application No. 61/532,470, filed on Sep. 8, 2011.

(51) Int. Cl.
  *H04N 7/18* (2006.01)
  *G03B 17/56* (2006.01)

(52) U.S. Cl.
  CPC ............... *H04N 7/18* (2013.01); *G03B 17/56* (2013.01); *H04N 7/183* (2013.01)

(58) Field of Classification Search
  None
  See application file for complete search history.

(56) References Cited

U.S. PATENT DOCUMENTS

| | | | | |
|---|---|---|---|---|
| 4,027,528 A * | 6/1977 | Tyree | ................... | G01N 29/265 73/620 |
| 4,312,162 A * | 1/1982 | Medney | ................... | E04H 12/16 52/223.4 |
| 5,065,249 A * | 11/1991 | Horn | ................... | F16M 11/04 348/375 |
| 5,399,009 A * | 3/1995 | Hiner | ................... | A47B 97/08 248/461 |
| 6,056,450 A | 5/2000 | Walling | | |

(Continued)

OTHER PUBLICATIONS

"Infrared Camera Rentals" [Retrieved on Sep. 29, 2011], Retrieved from Internet <http://www.atlas-inspection.com/infrared-camera-rentals.html>. 3 pgs.

(Continued)

*Primary Examiner* — Dakshesh Parikh
(74) *Attorney, Agent, or Firm* — Baker Hostetler LLP

(57) ABSTRACT

The present disclosure describes roof inspection devices, methods, and systems. One roof inspection device includes a pole, a camera coupled to an end of the pole and configured to capture an image of a roof, and a number of attachments coupled to the pole and configured to stabilize the pole on the roof or other elevated surface.

6 Claims, 5 Drawing Sheets

(56) References Cited

U.S. PATENT DOCUMENTS

| | | | |
|---|---|---|---|
| 7,869,944 B2 | 1/2011 | Deaton et al. | |
| 2002/0097321 A1* | 7/2002 | McBride | G02B 23/2476 |
| | | | 348/148 |
| 2004/0136388 A1* | 7/2004 | Schaff | 370/401 |
| 2006/0158549 A1* | 7/2006 | Digweed | H04N 5/2251 |
| | | | 348/373 |
| 2007/0053680 A1* | 3/2007 | Fromm | F16M 11/14 |
| | | | 396/420 |
| 2008/0162380 A1* | 7/2008 | Suga | G06F 17/5004 |
| | | | 705/400 |
| 2009/0216552 A1 | 8/2009 | Watrous | |
| 2009/0265193 A1* | 10/2009 | Collins et al. | 705/4 |
| 2012/0076485 A1* | 3/2012 | Zwahr | G03B 17/561 |
| | | | 396/425 |
| 2012/0211978 A1* | 8/2012 | Gardiner | F16B 7/0413 |
| | | | 285/382 |
| 2012/0322368 A1 | 12/2012 | Desai et al. | |

OTHER PUBLICATIONS

"Remote Visual Inspection—Overview" [Retrieved on Sep. 29, 2011], Retrieved from Internet <http://www.ashtead-technology.com/us/RemoteVisual/Content/Overview.html>. 1 pg.

"Rovver 225" [Retrieved on Sep. 29, 2011], Retrieved from internet < http://www.ge-mcs.com/en/remote-visual-inspection/robotic-crawlers/rovver-225.html>. 4 pgs.

"Telescopic Inspection Camera" [Retrieved on Sep. 29, 2011], Retrieved from internet <http://www.ukinspectioncamera.co.uk/acatalog/Telescopic_Camera_Pixie_Click.html>. 2 pgs.

\* cited by examiner

ROOF INSPECTION DEVICES, METHODS, AND SYSTEMS

CROSS-REFERENCE TO RELATED APPLICATIONS

This application is a continuation in part of U.S. application Ser. No. 13/298,083, filed Nov. 16, 2011, which claims the benefit of U.S. Provisional Application No. 61/532,470, filed Sep. 8, 2011, the entire specifications of which are incorporated herein by reference.

BACKGROUND

In some circumstances, an insurance company may need to inspect the roof, walls, windows, or any other elevated surface not accessible from the ground of a building (e.g., a house and/or dwelling) covered by an insurance policy issued by the insurance company. For example, if the roof of a building covered by an insurance policy is damaged due to, for instance, a storm, wind, hail, falling tree(s), water, and/or fire, among other causes of damage, the insurance company may need to inspect the damaged roof as part of a claims process. For instance, the insurance company may need to assess the condition of the roof (e.g., the extent and/or amount of the damage to the roof) in order to determine whether a loss exists and/or estimate the cost of repairing the damage.

In some previous roof inspection approaches, a human representative (e.g., a claims adjuster) of the insurance company may need to physically climb on to the roof (e.g., using a ladder) and/or walk around on the roof in order to inspect the roof. However, such a roof inspection method can be dangerous for the claims adjuster. Further, such a roof inspection method can be costly and/or time consuming for the insurance company.

DETAILED DESCRIPTION

Figure 1A:
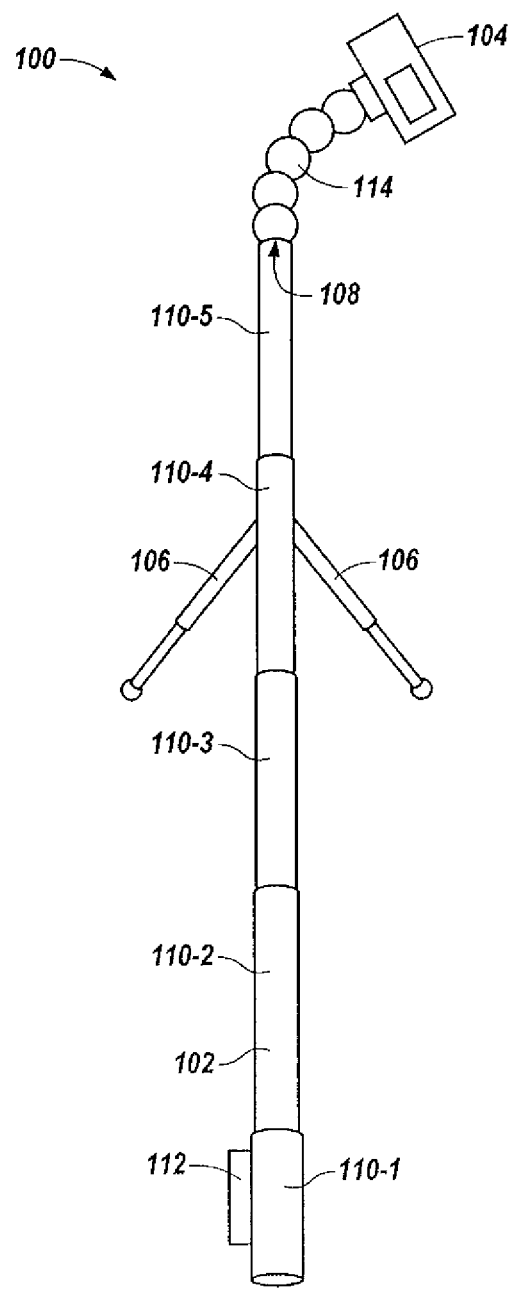
FIGS. 1A and 1B illustrate a system for inspecting a roof in accordance with one or more embodiments of the present disclosure.

The present disclosure describes roof inspection devices, methods, and systems. One or more embodiments include a pole, a camera coupled to an end of the pole and configured to capture an image of a roof, and a number of attachments coupled to the pole and configured to stabilize the pole on the roof or other elevated surface.

Roof inspection devices, methods, and/or systems in accordance with the present disclosure can be safer than previous roof inspection approaches (e.g, roof inspection approaches in which a person physically climbs on to the roof and/or walks around on the roof). Further, roof inspection devices, methods, and/or systems in accordance with the present disclosure can be less costly and/or less time consuming than previous roof inspection approaches.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 106 may reference element "06" in FIG. 1A and/or FIG. 1B, and a similar element may be referenced as 206 in FIG. 2.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure, and should not be taken in a limiting sense.

As used herein, "a" or "a number of" something can refer to one or more such things. For example, "a number of attachments" can refer to one or more attachments.

Figure 1B:
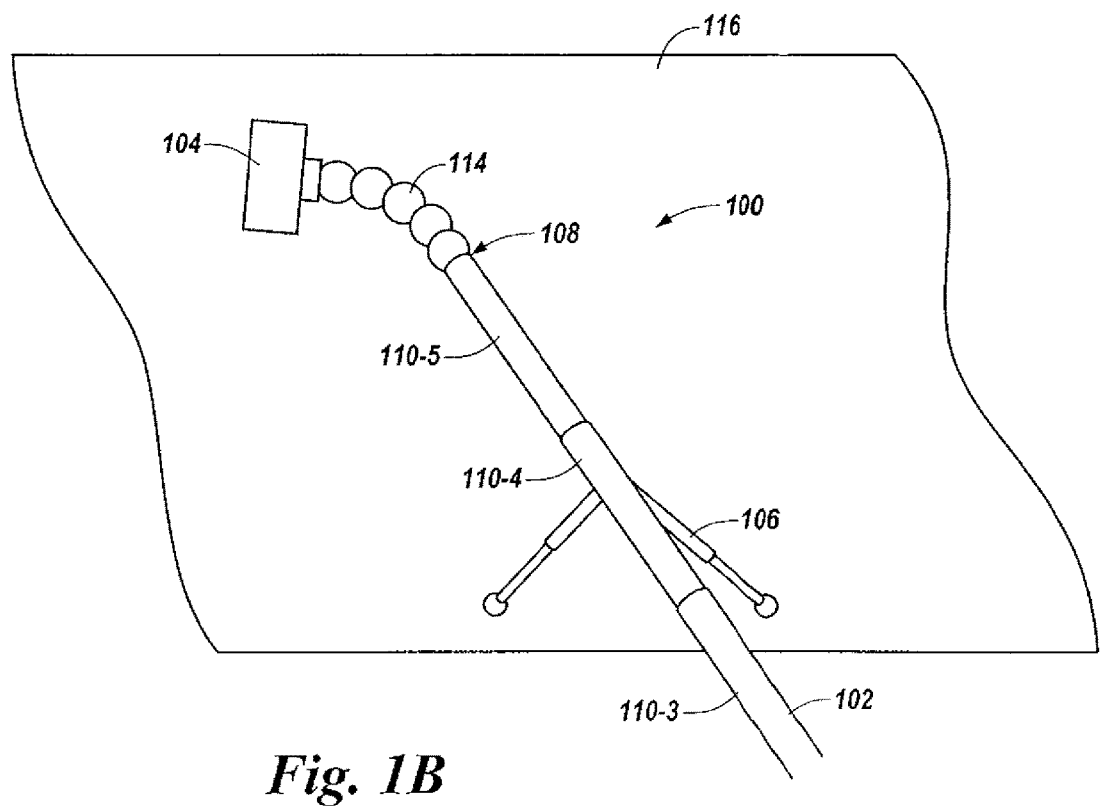

FIG. 1A illustrates a system 100 for inspecting a roof in accordance with one or more embodiments of the present disclosure. FIG. 1B illustrates a portion of the roof inspection system 100 while roof inspection system 100 is in use on (e.g., is being used to inspect) a roof 116. Roof 116 can be, for example, the roof of a building (e.g., a house and/or dwelling) covered by an insurance policy issued by an insurance company. Additionally and/or alternatively, roof 116 can be and/or include any elevated surface that is not accessible from the ground, such as, for instance, a wall(s) or window(s).

As shown in FIGS. 1A and 1B, roof inspection system 100 includes a pole 102. Pole 102 can be, for example, an extendable pole having a number of extendable sections (e.g., segments). For instance, in the embodiments illustrated in FIGS. 1A and 1B, pole 102 includes five extendable sections (e.g., sections 110-1, 110-2, 110-3, 110-4, and 110-5). However, embodiments of the present disclosure are not limited to a particular number of extendable sections for pole 102. In some embodiments, the last section of pole 102 (e.g., section 110-5) can be releasable (e.g., detachable and/or removable) from the rest of the pole (e.g., from the other sections of the pole).

Pole 102 (e.g., one or more sections of pole 102) can be extended (e.g., partially or fully extended) while roof inspection system 100 is being used to inspect a roof (e.g., roof 116), as illustrated in FIG. 1B. For example, in the embodiments illustrated in FIGS. 1A and 1B, pole 102 is in a fully extended position (e.g., all sections of pole 102 are extended). Pole 102 can be retracted (e.g., not extended) when roof inspection system 100 is not in use. For example, pole 102 can be retracted while roof inspection system 100 is being stored and/or transported.

In some embodiments, pole 102 can be a non-conductive pole. For example, pole 102 can include a non-conductive (e.g., insulator) material such as, for instance, a non-metal material. For instance, pole 102 can be a carbon fiber pole (e.g., include a carbon fiber material). As an additional example, an insulator material, such as, for instance, a fiberglass material, can be wrapped around a portion or all of pole 102.

As shown in FIGS. 1A and 1B, roof inspection system 100 includes an adjustable camera mount 114 coupled to an end 108 (e.g., the top) of pole 102. End 108 can be, for instance, a part of (e.g., an end of) the last section of pole 102 (e.g., section 110-5), as illustrated in FIGS. 1A and 1B.

As shown in FIGS. 1A and 1B, adjustable camera mount 114 (e.g., the position of adjustable camera mount 114) can be adjusted (e.g., moved and/or bent) with respect to pole 102. Accordingly, adjustable camera mount 114 can provide flexibility for a camera (e.g., camera 104) mounted therein, while at the same time keeping the camera stable while it is in use (e.g., while it is capturing images of roof 116). For instance, a camera mounted in adjustable camera mount 114 can capture different images of roof 116 (e.g., images of different portions of roof 116) without moving pole 102 (e.g., while pole 102 remains in the same position on roof 116). Adjustable camera mount 114 will be further described herein (e.g., in connection with FIG. 3).

As shown in FIGS. 1A and 1B, roof inspection system 100 includes a camera 104 coupled to (e.g., mounted in) adjustable camera mount 114. Camera 104 can be, for example, a light weight and/or high resolution digital camera. Camera 104 can be, for example, a remotely controllable and/or remotely operable camera. That is, camera 104 can be controlled and/or operated from a location other than the location of the camera, as will be further described herein.

Camera 104 can capture (e.g., produce, generate, and/or acquire) a number of images (e.g., a number of digital images) of a roof (e.g., roof 116) that is being inspected. For example, camera 104 can capture a number of images of a roof that has been damaged due to, for instance, a storm, wind, hail, falling tree(s), water, and/or fire, among other causes of damage. Camera 104 can capture images of a portion(s) of the roof (e.g., the damaged portion(s)) and/or images of the entire roof. As an example, after camera 104 captures an image of a roof, adjustable camera mount 114 (e.g., the position of adjustable camera mount 114) can be adjusted (e.g., moved), and camera 104 can then capture a different image of the roof (e.g., an image of a different portion of the roof) after adjustable camera mount 114 is adjusted.

In some embodiments, camera 104 can be a releasable (e.g., detachable and/or removable) camera. That is, camera 104 can be released (e.g., detached and/or removed) from adjustable camera mount 114. For instance, camera 104 can be released from adjustable camera mount 114 after capturing an image of the roof. In such embodiments, after camera 104 is released from adjustable camera mount 114, camera 104 can move around on the roof to capture images of different parts of the roof. For example, camera 104 can move around on the roof to capture images of portions of the roof that may not be accessible to pole 102 (e.g., portions of the roof that may not be accessible to camera 104 when it is attached to the end 108 of pole 102). For instance, camera 104 be moved to capture an image over an edge(s) of the roof (e.g., to peak over the edge of the roof).

In some embodiments, camera 104 can be a hotspot (e.g., a Wifi hotspot) that can create its own network (e.g., its own wireless network) (not shown in FIG. 1A or 1B). As used herein, a "network" (e.g., the network created by camera 104) can provide a communication system that directly or indirectly links two or more computers and/or peripheral devices (e.g., camera 104 and mobile device 112, as will be further described herein) and allows users to access resources on other computing devices and exchange messages with other users. A network can allow users to share resources on their own systems with other network users and to access information on centrally located systems or on systems that are located at remote locations.

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

As shown in FIGS. 1A and 1B, roof inspection system 100 includes an attachment 106 coupled to pole 102 (e.g., to a shaft and/or one of the extendable sections of pole 102). In the embodiments illustrated in FIGS. 1A and 1B, attachment 106 is an extendable bipod attachment. Although the embodiments illustrated in FIGS. 1A and 1B include one attachment 106 coupled to pole 102, embodiments of the present disclosure are not so limited, and can include any number (e.g., more than one) of attachments 106 coupled to pole 102.

In some embodiments, attachment 106 may not be a releasable (e.g., detachable and/or removable) attachment. That is, attachment 106 may not be releasable from pole 102.

Attachment 106 can be used to stabilize pole 102 (e.g., prevent pole 102 from moving) while pole 102 is on the roof (e.g., while pole 102 is extended and/or while camera 104 is capturing images of the roof) and/or to move pole 102 along the roof. As an example, after camera 104 captures an image of a roof, and while pole 102 remains extended, attachment 106 can be used to move pole 102 to a different location on the roof and stabilize pole 102 at the different location. Camera 104 can then capture a different image of the roof (e.g., an image of a different portion of the roof) while pole 102 is stabilized at the different location. Further, attachment 106 can provide consistent distances for pole 102 that can result in camera 104 capturing standardized images of the roof. Attachment 106 will be further described herein (e.g., in connection with FIG. 2).

As shown in FIG. 1A, roof inspection system 100 includes a mobile device 112. Mobile device 112 can be, for example, tablet, a mobile phone, a smart phone, a personal digital assistant (PDA), a smart device, etc. Mobile device 112 can be a hotspot that can create its own network (not shown in FIG. 1A).

Mobile device 112 (e.g., a user of mobile device 112) can communicate with, control, and/or operate camera 104 via the network created by mobile device 112 and/or the network created by camera 104. For example, mobile device 112 can instruct camera 104 to capture an image of a roof (e.g., roof 116) and send (e.g., transmit) the captured image to mobile device 112. Mobile device 112 can receive the captured image of the roof sent from camera 104 and/or display the captured image (e.g., to a user of mobile device 112), as will be further described herein. As an additional example, mobile device 112 can release camera 104 from pole 102 and move camera 104 around on the roof after camera 104 is released from pole 102.

In some embodiments, mobile device 112 can send the captured image of the roof to an additional computing device (not shown in FIG. 1A or 1B). The additional computing device can be, for example, a mobile device (e.g., a tablet, a mobile phone, a smart phone, a personal digital assistant (PDA), a smart device, etc.), a laptop computer, or a desktop computer, among other types of computing devices. The additional computing device can be located at or near the location of roof inspection system 100, or at a location remote to roof inspection 100 (e.g., at a building of the insurance company).

In the embodiment illustrated in FIG. 1A, mobile device 112 is coupled to pole 102 (e.g., near the bottom of pole 102). Mobile device 112 can be coupled to pole 102 by, for example, an adjustable (e.g., flexible) mount (not shown in FIG. 1A). However, embodiments of the present disclosure are not so limited. For example, in some embodiments, mobile device 112 may not be coupled to pole 102. Further, in some embodiments, mobile device 112 can be releasable from pole 102. For instance, in some embodiments, mobile device 112 can be coupled to a strap (e.g., a utility strap) that can be wore by (e.g., hooks around the neck of) the user (e.g., operator) of mobile device 112. Mobile device 112 will be further described herein (e.g., in connection with FIG. 3).

Roof inspection system 100 can, for example, be used by a claims adjuster of an insurance company or a technician to inspect the roof of a building (e.g., roof 116) covered by an insurance policy issued by the insurance company. For example, the claims adjuster can use roof inspection system 100 to inspect a roof that has been damaged due to, for instance, a storm, wind, hail, falling tree(s), water, and/or fire, among other causes of damage, as part of a claims process. For instance, the claims adjuster may use roof inspection system 100 to assess the condition of the roof (e.g., the extent and/or amount of the damage to the roof) in order to determine whether a loss exists and/or estimate the cost of repairing the damage.

By using roof inspection system 100 to inspect the roof, the claims adjuster can inspect the roof and other places not accessible from the ground without having to physically climb on to the roof and/or walk around on the roof. For example, the claims inspector may be able to inspect the roof from the ground. In contrast, in some previous roof inspection approaches, the claims adjuster may need to physically climb on to a roof (e.g., using a ladder) and/or walk around on the roof in order to inspect the roof. Accordingly, using roof inspection system 100 to inspect a roof can be safer, less costly, and/or less time consuming than such previous roof inspection approaches.

Figure 2:
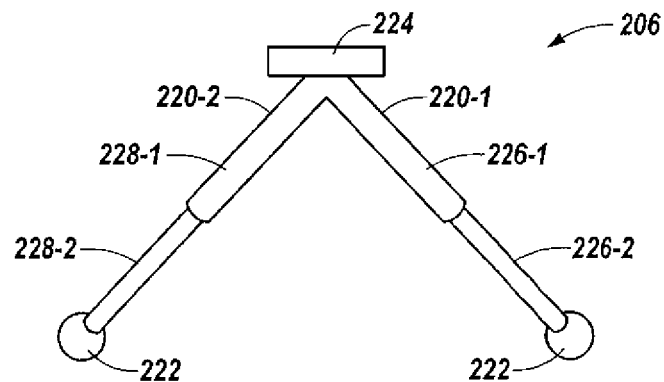
FIG. 2 illustrates an attachment of a roof inspection system in accordance with one or more embodiments of the present disclosure.

FIG. 2 illustrates an attachment 206 (e.g., an extendable bipod attachment) of a roof inspection system in accordance with one or more embodiments of the present disclosure. Attachment 206 can be, for example, attachment 106 of roof inspection system 100 previously described in connection with FIGS. 1A and 1B.

As shown in FIG. 2, attachment 206 includes members (e.g., legs) 220-1 and 220-2. Members 220-1 and 220-2 can be, for example, extendable members having a number of extendable sections (e.g., segments). For instance, in the embodiment illustrated in FIG. 2, members 220-1 and 220-2 each include two extendable sections (e.g., member 220-1 includes sections 226-1 and 226-2, and member 220-2 includes sections 228-1 and 228-2). However, embodiments of the present disclosure are not limited to a particular number of extendable sections for members 220-1 or 220-2.

Attachment 206 (e.g., one or more sections of the members of attachment 206) can be extended (e.g., partially or fully extended) while roof inspection system 100 is being used to inspect a roof (e.g., roof 116). For example, attachment 206 can be extended before extending pole 102 and/or before stabilizing pole 102 on the roof. In the embodiment illustrated in FIG. 2, attachment 206 is in a fully extended position (e.g., all sections of members 220-1 and 220-2 are extended). While extended (e.g., while in the fully extended position illustrated in FIG. 2), attachment 206 can be used to stabilize pole 102 (e.g., prevent pole 102 from moving) while pole 102 is on the roof and/or to move pole 102 along the roof.

Attachment 206 (e.g., the sections of members 220-1 and 220-2) can be retracted (e.g., not extended) when roof inspection system 100 is not in use. For example, attachment can be retracted while roof inspection system 100 is being stored and/or transported.

As shown in FIG. 2, attachment 206 includes a wheel 222 coupled to the end (e.g., the bottom) of each member 220-1 and 220-2. That is, a wheel 222 can be coupled to a part of (e.g., the end of) the last section of member 220-1 (e.g., section 226-2), and to a part of (e.g., the end of) the last section of member 220-2 (e.g., section 228-2), as illustrated in FIG. 2.

As shown in FIG. 2, attachment 206 includes a coupling member 224 coupled to members 220-1 and 220-2. Coupling member 224 can couple members 220-1 and 220-2 to a pole (e.g., pole 102 previously described in connection with FIG. 1) of the roof inspection system. Embodiments of the present disclosure are not limited to the particular coupling member 224 illustrated in FIG. 2, and can include any type of coupling member that can couple members 220-1 and 220-2 to the pole of the roof inspection system.

Figure 2A:
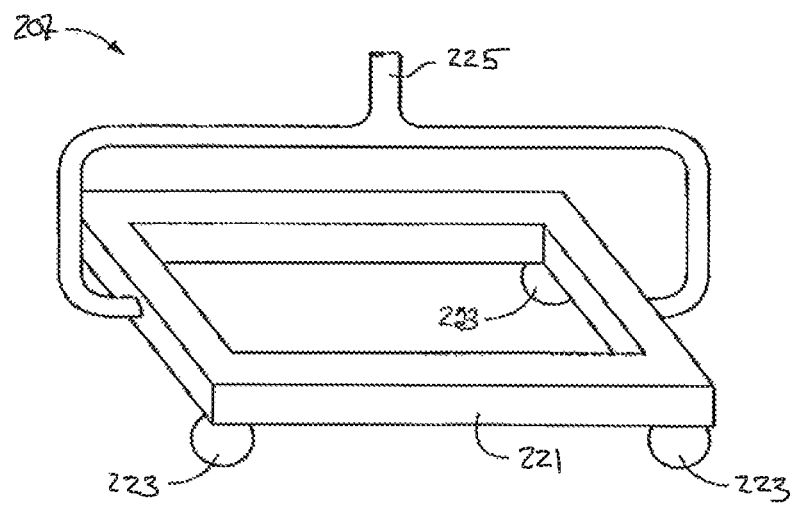
FIG. 2A illustrates another attachment of a roof inspection system in accordance with one or more embodiments of the present disclosure.

FIG. 2A illustrates another attachment 207 of a roof inspection system in accordance with one or more embodiments of the present disclosure. Attachment 207 can be, for example, substitute for attachment 106 of roof inspection system 100 previously described in connection with FIGS. 1A and 1B.

As shown in FIG. 2A, attachment 207 includes a base member 221.

Base member 221 can have a gap, space, and/or opening therein, as illustrated in FIG. 2A. In the embodiment illustrated in FIG. 2A, base member 221 is rectangular shaped. However, embodiments of the present disclosure are not limited to the rectangular shape illustrated in FIG. 2A for base member 221. For example, base member 221 can be any rectangular and/or non-rectangular shape.

As shown in FIG. 2A, attachment 207 includes a number of wheels 223 coupled to the bottom of base member 221. In the embodiment illustrated in FIG. 2A, attachment 207 includes a wheel 223 coupled to each corner of base member 221. However, embodiments of the present disclosure are not limited to a particular number of wheels or wheel location.

As shown in FIG. 2A, attachment 207 includes a coupling member 225 coupled to base member 221. Coupling member 225 can couple base member 221 to a pole (e.g., pole 102 previously described in connection with FIG. 1) of the roof inspection system.

Figure 3:
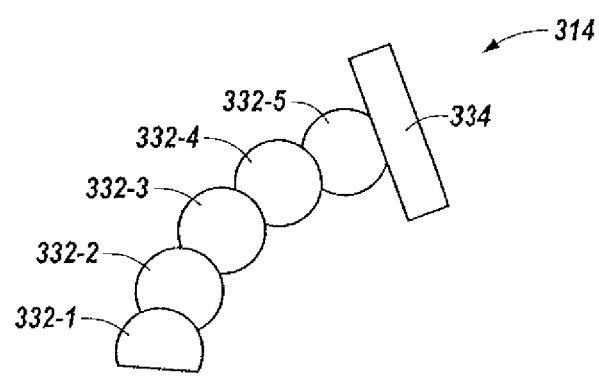
FIG. 3 illustrates an adjustable camera mount of a roof inspection system in accordance with one or more embodiments of the present disclosure.

FIG. 3 illustrates an adjustable camera mount 314 of a roof inspection system in accordance with one or more embodiments of the present disclosure. Adjustable camera mount 314 can be, for example, adjustable camera mount 114 of roof inspection system 100 previously described in connection with FIGS. 1A and 1B.

Adjustable camera mount 314 can include a number of flexible members. For example, adjustable camera mount 314 can include a number of flexible spherical shaped members coupled in series. For instance, in the embodiment illustrated in FIG. 3, adjustable camera mount 314 includes five flexible spherical shaped members (e.g., spherical shaped members 332-1, 332-2, 332-3, 332-4, and 332-5) coupled in series (e.g., spherical shaped member 332-2 is coupled to spherical shaped member 332-1, spherical shaped member 332-3 is coupled to spherical shaped member 332-2, spherical shaped member 332-4 is coupled to spherical shaped member 332-3, and spherical shaped member 332-5 is coupled to spherical shaped member 332-4). The first flexible spherical shaped member of the series (e.g., spherical shaped member 332-1) can be coupled to an end of a pole (e.g., end 108 of pole 102 previously described in connection with FIG. 1) of the roof inspection system. Embodiments of the present disclosure, however, are not limited to a particular number of flexible members or a particular type (e.g., shape) of flexible member for adjustable camera mount 314.

Adjustable camera mount 314 can include a camera mount coupled to one of the flexible members. For example, in the embodiment illustrated in FIG. 3, adjustable camera mount 314 includes a camera mount 334 coupled to the last flexible spherical shaped member of the series (e.g., spherical shaped member 332-5). A camera (e.g., camera 104 previously described in connection with FIG. 1) can be coupled to the camera mount.

As shown in FIG. 3, adjustable camera mount 314 (e.g., the position of adjustable camera mount 314) can be adjusted (e.g., moved and/or bent) by adjusting (e.g. moving and/or bending) one or more of the flexible members. Accordingly, adjustable camera mount 314 can provide flexibility for a camera (e.g., camera 104) mounted therein, while at the same time keeping the camera stable while it is in use.

Figure 4:
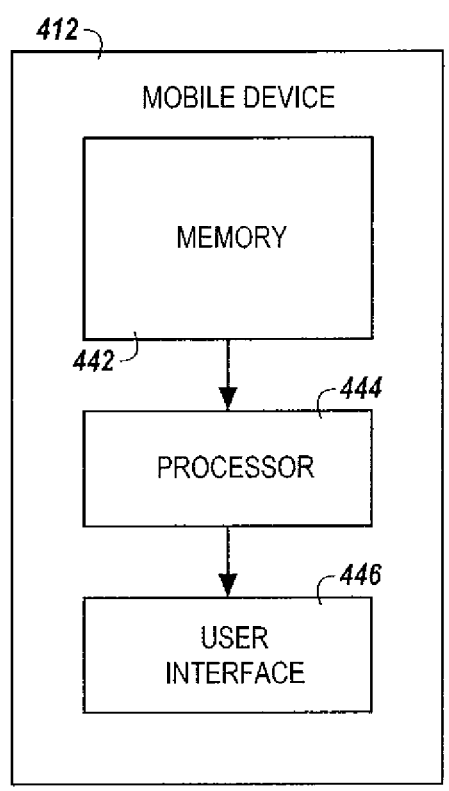
FIG. 4 illustrates a mobile device of a roof inspection system in accordance with one or more embodiments of the present disclosure.

FIG. 4 illustrates a mobile device 412 of a roof inspection system in accordance with one or more embodiments of the present disclosure. Mobile device 412 can be, for example, mobile device 112 of roof inspection system 100 previously described in connection with FIGS. 1A and 1B.

As shown in FIG. 4, mobile device 412 includes a memory 442 and a processor 444 coupled to memory 442. Memory 442 can be any type of storage medium that can be accessed by processor 444 to perform various examples of the present disclosure. For example, memory 442 can be a non-transitory computer readable medium having computer readable instructions (e.g., computer program instructions) stored thereon that are executable by processor 444 to perform various examples of the present disclosure. That is, processor 444 can execute the executable instructions stored in memory 442 to perform various examples of the present disclosure.

Memory 442 can be volatile or nonvolatile memory. Memory 442 can also be removable (e.g., portable) memory, or non-removable (e.g., internal) memory. For example, memory 442 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 442 is illustrated as being located in mobile device 412, embodiments of the present disclosure are not so limited. For example, memory 442 can also be located internal to another computing resource (e.g., enabling computer readable instructions to be downloaded over the Internet or another wired or wireless connection).

In some embodiments, memory 442 can have computer readable instructions stored thereon that are executable by processor 444 to communicate with, control, and/or operate camera 104 previously described in connection with FIGS. 1A and 1B. For example, memory 442 can have computer readable instructions stored thereon that are executable by processor 444 to instruct camera 104 to capture an image of a roof (e.g., roof 116 previously described in connection with FIG. 1B) and send (e.g., transmit) the captured image to mobile device 412. As an additional example, memory 442 can have computer readable instructions stored thereon that are executable by processor 444 to release camera 104 from pole 102 previously described in connection with FIGS. 1A and 1B and move camera 104 around on the roof after camera 104 is released from pole 102.

As shown in FIG. 4, mobile device 412 includes a user interface 446. User interface 446 can provide (e.g., display and/or present) and/or receive information (e.g., data and/or images) to and/or from a user (e.g., operator) of mobile device 412. For example, user interface 446 can include a screen (e.g., viewfinder) that can display images to the user of mobile device 412.

As an example, user interface 446 can display the image of the roof captured and sent to mobile device 412 by camera 104. In some embodiments, user interface 446 can display the image of the roof as camera 104 captures the image. That is, the user of mobile device 412 can view the image as it is being captured by camera 104 (e.g., the user can see what camera 104 sees).

The user of mobile device 412 can be, for instance, a claims adjuster of an insurance company who is performing an inspection of a roof, as previously described herein, or a technician trained to use the device for inspections. By viewing the image of the roof on user interface 446 of mobile device 412, the claims adjuster can inspect the roof and other places not accessible from the ground without having to physically climb on to the roof and/or walk around the roof, as previously described herein.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the present disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the disclosed embodiments of the present disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A device, comprising:
   an extendable pole having a plurality of carbon fiber pole sections between a first end and a second end;
   a number of flexible spherical shaped members coupled in series to the first end of the extendable pole;
   a camera mount coupled to one of the number of flexible spherical shaped members;
   a camera releasably coupled to the camera mount and configured to capture an image of a roof; and
   a stabilizer coupled to a surface of at least one of the plurality of carbon fiber pole sections, the stabilizer adapted to stabilize the extendable pole on the roof as the second end is operated by a user on a ground surface to capture the image, the stabilizer comprising:
   a plurality of extendible legs, each leg having a first leg end and a second leg end;
   a coupling member coupling the surface of at least one of the plurality of carbon fiber pole sections to the first leg end of each of the plurality of extendible legs; and
   a plurality of wheels arranged to engage the roof, wherein each wheel of the plurality of wheels is coupled to the second leg end of a respective one of the plurality of extendible legs.

2. The device of claim 1, further comprising an insulator material coating at least a portion of the extendable pole.

3. The device of claim 2, wherein the insulator material is a fiberglass material.

4. The device of claim 1, further comprising a detachable pole extender, wherein the detachable pole extender is removably coupled to the second end.

5. The device of claim 1, further comprising:
   a mount coupled to the extendable pole, the mount adapted to receive a mobile device.

6. The device of claim 5, wherein the mobile device is communicatively coupled to the camera.

* * * * *